United States Patent
Booth, Jr.

(10) Patent No.: US 6,935,987 B1
(45) Date of Patent: *Aug. 30, 2005

(54) CONTROL METHODOLOGY FOR INERTIAL ENERGY STORAGE DEVICES

(76) Inventor: Richard A. Booth, Jr., 4372 N. Wildwood Ave., Milwaukee, WI (US) 53211

( * ) Notice: Subject to any disclaimer, the term of this patent is extended or adjusted under 35 U.S.C. 154(b) by 34 days.

This patent is subject to a terminal disclaimer.

(21) Appl. No.: 09/819,033

(22) Filed: Aug. 31, 2000

Related U.S. Application Data

(63) Continuation of application No. 09/235,192, filed on Jan. 22, 1999, now Pat. No. 6,120,411.

(51) Int. Cl.[7] .......................... F16H 15/38; F03G 3/08; B60K 6/10
(52) U.S. Cl. ................... 476/4; 74/572; 74/6; 180/165; 185/37; 185/39; 185/41 R; 476/47
(58) Field of Search ............................ 74/5 R, 5.22, 64, 74/83, 665 A, 665 B, 572; 475/267; 476/4, 476/47; 60/413, 414; 180/165, 337, 338; 185/65 R, 37, 39, 41 R; 322/4; 318/61; 477/2, 477/6; 701/54

(56) References Cited

U.S. PATENT DOCUMENTS

| | | | |
|---|---|---|---|
| 1,079,259 A * | 11/1913 | Nehlsen ........................ 322/4 |
| 3,858,674 A * | 1/1975 | Tabor ........................ 180/65 R |
| 4,169,391 A * | 10/1979 | Schonberger ................. 74/5 R |
| 4,309,620 A * | 1/1982 | Bock ........................ 180/65 A |
| 4,358,719 A * | 11/1982 | Currier et al. .............. 318/161 |
| 4,361,055 A * | 11/1982 | Kinson ........................ 74/5.22 |
| 4,498,015 A * | 2/1985 | Gottfried ..................... 74/5.22 |
| 4,715,258 A * | 12/1987 | Shigematsu et al. .......... 477/43 |
| 5,243,868 A * | 9/1993 | Schonberger .................. 74/64 |
| 5,492,189 A * | 2/1996 | Kriegler et al. ............ 180/65.2 |
| 6,244,368 B1 * | 6/2001 | Ando et al. ................. 180/65.2 |
| 6,327,922 B1 * | 12/2001 | Hewatt ........................ 74/5 R |
| 6,634,247 B2 * | 10/2003 | Pels et al. ..................... 74/329 |

* cited by examiner

*Primary Examiner*—David A. Bucci
*Assistant Examiner*—Colby Hansen

(57) ABSTRACT

A wheeled vehicle incorporating a control methodology for regulating the power input and output of an inertial energy storage device, specifically a flywheel. The control methodology utilizes a continuously variable transmission (CVT) and comprises control of the CVT speed ratio based on feedback of the CVT output torque. The CVT ratio control signal is based on an error signal equal to the difference between operator input and CVT output torque. Operator input may be a positive or a negative value, a negative value corresponding to regenerative power. Operator input corresponds to required force or torque analogous to throttle opening or braking effort. This methodology continuously synchronizes the speeds of the inertial energy storage device and vehicle wheels, keeping frictional losses to a minimum.

13 Claims, 1 Drawing Sheet

CONTROL METHODOLOGY FOR INERTIAL ENERGY STORAGE DEVICES

CROSS REFERENCE TO RELATED APPLICATION

This application is a continuation of U.S. patent application Ser. No. 09/235,192 filed on Jan. 22, 1999 which is now U.S. Pat. No. 6,120,411 issued on Sep. 19, 2000.

BACKGROUND OF THE INVENTION

Regulation of stored energy is essential to most machinery. Various forms of energy storage are in common usage (e.g. chemical, elastic, pneumatic). The control of power flow from inertial energy storage means has proven to be more difficult than from other forms.

Storage of energy by means of inertial energy advanced during the 1980's and 1990's through development of flywheels made from aerospace materials, rotating in near total vacuum and supported on magnetic bearings. Such devices can have energy densities equal to or greater than lead acid storage batteries.

Electrical power backup systems employing such advanced flywheels with an integral motor/generator have been commercialized. The motor function of the electrical power backup system motor/generator drives the flywheel to optimal storage speed when the normal electrical power source is available. The generator function supplies back-up electricity in the case of power outages drawing power from the flywheel.

The electrical power backup system motor/generator need not operate at a specific speed because alternating current of a specific frequency, if required, is maintained with electrical circuitry during backup power generation. The motor/generator therefore spins at a fixed ratio to instantaneous flywheel speed (not a multiple of the alternating current frequency).

Variable speed machinery that must operate at a specific speed in a specific condition (for example a vehicle) requires a control mechanism to accommodate the speed difference between the machinery and the (inherently variable speed) inertial energy storage device.

The application of a continuously variable transmission (CVT) or infinitely variable transmission (IVT) to variable speed machinery is obvious. Control of the power flow through a CVT to machinery that incorporates an inertial energy storage means has been the subject of previous patents. For example, in U.S. Pat. No. 3,672,244 Mr. Nasvytis describes a "foot pedal ... connected to said [(infinitely variable)] transmission means to decrease the ratio of the transmission upon depression of the foot pedal and increase the ratio upon release of the foot pedal". The CVT is controlled directly by operator input and there is no feedback.

In cases where the CVT speed ratio is controlled directly by an operator, as with the Mr. Nasvytis' foot pedal, the CVT control position is the operator's input for speed ratio. The rate of change of the CVT ratio is the acceleration input. For machinery in which the CVT ratio can change more rapidly than the machinery can accelerate, the operator must be skilled at not changing the ratio at a rate greater than the machinery can tolerate. The limitation to acceleration of the machinery will in most cases be slippage or breakage. Using an automobile for an example, the limit to acceleration is slippage of the tires; tires would slip if the speed control were changed too quickly.

In the event that the rate of change of the CVT ratio frequently exceeds the acceleration capability of the machinery, even momentarily, and causes slippage, energy is wasted, which is counter to the original goal of using inertial storage.

Operators of machinery need precise control of acceleration in addition to the ability to set speed. A wide variety of machinery is either powered by a combustion engine, controlled with friction braking, or both. Throttle position determines the force (torque) and therefore acceleration of the machinery. Friction braking controls force and therefore deceleration.

Due to the difficulty in controlling acceleration via rate of controller actuation, the predominance of force application controls or the energy wasted due to slippage, direct CVT control of machinery utilizing a inertial energy storage device has not been widely implemented.

An alternative to CVT control has been to utilize two motor/generators (both similar to the backup electrical power system). One motor/generator operates at the same speed as the inertial energy source, the second at the same speed as the machinery. Energy flow is regulated electrically. This system was employed in a concept vehicle developed by Rosen Motors and described in *Time Magazine*, Sep. 23, 1996.

The cost of two motor/generator units in the two motor/generator system is a drawback of this system. Additionally, electrical motors and conductors sized to supply peak power will have relatively high electrical resistance losses at low power flows.

The prior art for control of power flow from a inertial energy source includes the utilization of a clutch or clutch systems. The clutches accommodate the speed difference between the machinery and a inertial energy storage device and regulate the power flow to and from machinery from an inertial energy storage system.

Representative of clutch systems is the teaching of Mr. Smitley in U.S. Pat. No. 4,342,371. Two over-running clutches, one for forward rotation and one for reverse rotation, may be selectively engaged to transmit power to a storage flywheel through corresponding forward and reverse rotating magnetic clutches. Some slippage of the magnetic clutches is anticipated.

The drawback of clutch systems, whether frictional or magnetic, is that slippage will dissipate energy that could, in the absence of slippage, be transmitted to the machinery or stored in the flywheel.

BRIEF SUMMARY OF THE INVENTION

The present invention is a control methodology for an inertial energy storage device that utilizes a continuously variable transmission (CVT). The CVT ratio is a function of an error signal equal to the difference between operator input and CVT output torque.

This methodology continuously synchronizes the speeds of the inertial energy storage device and powered machinery, keeping frictional losses to a minimum.

Operator input may be a positive or a negative value, a negative value corresponding to regenerative power. Operator input is force or torque analogous to throttle opening or braking effort.

BRIEF DESCRIPTION OF THE SEVERAL VIEWS OF THE DRAWING

The present invention is shown schematically in FIG. 1. The inertial energy storage means 1 (shown as a flywheel) is coupled directly to the machinery 3 (shown as a wheel) through CVT 2. Elasticity between the CVT 2 and machinery 3 is shown in FIG. 1 as spring 4.

Figure 3:
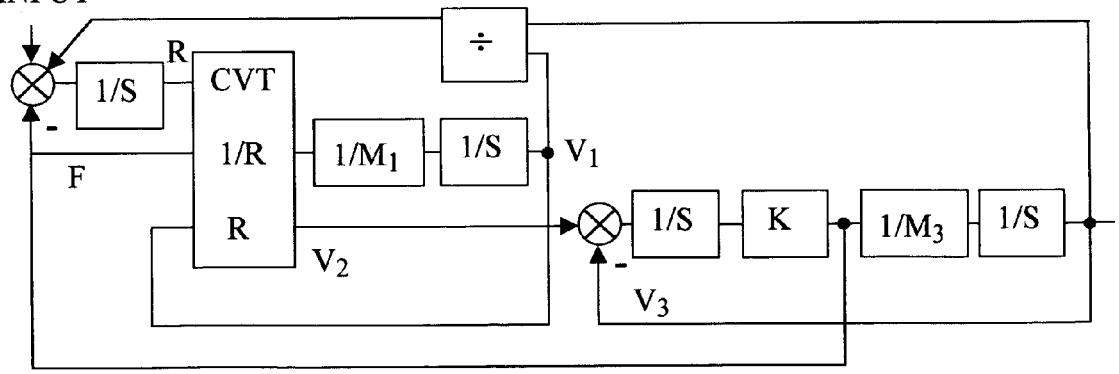

Block diagram FIG. 3, also using the Laplace variable "s", represents an embodiment of the present invention in which an additional feedback loop is incorporated.

Computation may be performed with linear units or angular units.

Figure 1:
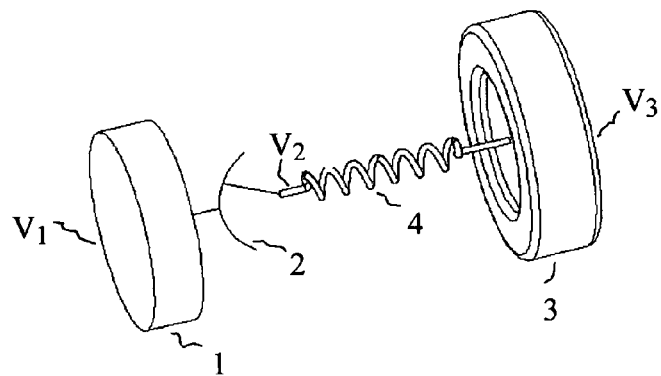
Figure 2:
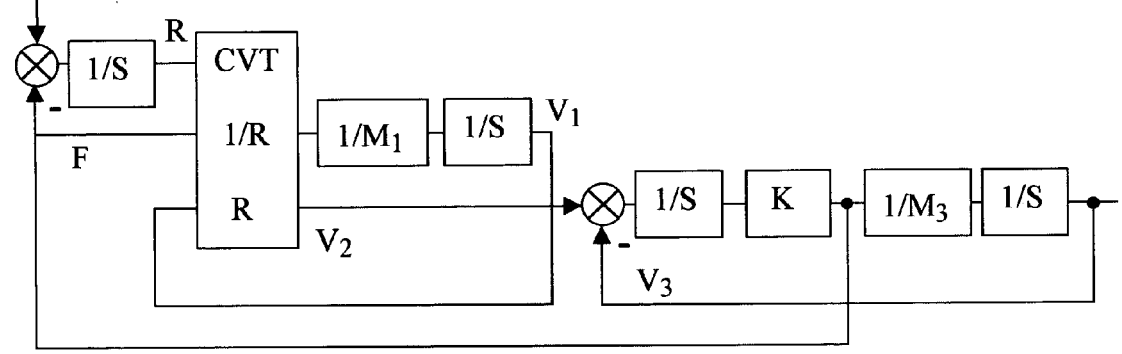
FIG. 2 is a block diagram using the Laplace variable "s" representing an embodiment of the present invention in which the CVT ratio is equal to the time integral of an error signal.

In FIGS. 1, 2 and 3 $V_1$, $V_2$ and $V_3$ represent the rotational velocity of the flywheel, the CVT output and the powered machinery respectively.

In both FIG. 2 and FIG. 3 the notation is as follows:
S=Laplace variable
$M_1$=Mass or moment of inertia of the flywheel 1
$M_3$=Mass or moment of inertia of the powered machinery 3
K=Spring Rate (linear or rotational) of elasticity 4 between the CVT 2 and machinery 3
F=Force or torque acting across elasticity 4 between the CVT 2 and machinery 3

The mass or moment of inertia of the output shaft of CVT 2 and elasticity 4 (which would be $M_2$) is low compared to $M_1$ and $M_3$ and ignored.

The CVT is represented by a block labeled "CVT". The input to the CVT is R, the instantaneous ratio. The CVT has the following effects:

Force or torque acting on $M_1$=F×1/R $V_2=V_1*R$

DETAILED DESCRIPTION OF THE INVENTION

The present invention is a control methodology for a inertial energy storage device that utilizes a continuously variable transmission (CVT). Control of the CVT speed ratio is based on feedback of the CVT output torque. With this control methodology, the operator inputs force or torque just as with an engine or brake. The methodology employs no clutches or other slipping mechanisms and therefore dissipates only the hysteritic loses in metallic elastic structural elements, including the CVT.

The present invention is shown schematically in FIG. 1. The inertial energy storage means 1 is coupled directly to the machinery 3 through CVT 2.

Advantage is taken of the inherent elasticity of the coupling shafts. If however, inherent elasticity is insufficient for control purposes, a discrete spring may also be included in the system between CVT 2 and machinery 3. This elasticity, whether inherent or discrete, is shown schematically in FIG. 1 (and referred to herein) as spring 4.

Referring to FIG. 1 the output speed of the CVT, $V_2$, is equal to the speed of the inertial energy storage means times the instantaneous CVT speed ratio, $V_1*R$. At equilibrium the average CVT output speed $V_2$ must equal the average machinery speed $V_3$. At any time $V_2$ is greater than $V_3$ deflection of spring 4 will increase thereby increasing the force acting across spring 4 in proportion to the stiffness of spring 4. (Force decreases when $V_2$ is less than $V_3$ with the sign convention that negative force decelerates machinery 3.)

In the present invention the CVT speed ratio is increased or decreased as a function of either the measured deflection of spring 4, or the measured force across spring 4.

In a physical system a clutch in series with the CVT may be included to completely disengage the machinery from the inertial energy storage means when the machinery is either at rest or at a speed in excess of the capability of the CVT. However, the clutch is not considered to be a component of the power regulation control system. The clutch does not slip in normal operation, although it may be engineered to act as a force or torque limiter.

In a physical system a fixed ratio transmission in series with the CVT may be included to allow the CVT to operate in the design speed range of the CVT. A fixed ratio transmission may also provide "reverse" capability for the machinery. However, the fixed ratio transmission is not considered to be a component of the power regulation control system.

Control system dynamics are analyzed using block diagrams and the Laplace variable. This method is most useful when the control system is linear or can be linearized.

A CVT can be represented mathematically by multiplication of a ratio times an input speed. Multiplication is extremely nonlinear invalidating block diagram analysis. However, the control system block diagram can be used to illustrate the control methodology of the present invention.

Block diagram FIG. 2 represents an embodiment of the present invention in which the CVT ratio is equal to the time integral of an error signal (1/s in the Laplace domain). The error signal is the difference between operator input force and the force in spring 4, labeled $F_4$. With initial conditions of $V_2$ not equal to $V_3$, this control system will synchronize $V_2$ with $V_3$ after a number of oscillations. The error signal becomes zero when the spring force equals the input force, in which case the time integral (which is the CVT ratio) remains constant.

The time integral in the embodiment represented by FIG. 2 is not classic P-I Proportional-Integral feedback.

Block diagram FIG. 3 represents an embodiment of the present invention in which an additional feedback loop is incorporated. In the absence of operator input or force in spring 4 CVT ratio R is V3/V1 such that V2=V3. With operator input, spring force increases until the spring force equals the operator input, in which case the error signal is zero and once again V2=V3.

In the second embodiment the error signal feedback behaves similarly to feedback elements in a linear controls systems despite the non-linear nature of the CVT. Proportional, Proportional-Integral (P-I) feedback, Classical Proportional-Integral-Derivative (P-I-D) feedback or other well understood methods may be applied to achieve desired control.

What is claimed is:

1. A wheeled vehicle which includes: a flywheel for energy storage, a continuously variable transmission (CVT) coupled by a shaft to and driven by said flywheel, at least one wheel of the vehicle coupled by a shaft to and driven by said CVT, and a feedback system for controlling the speed ratio of said CVT based on feedback of CVT output torque.

2. The wheeled vehicle according to claim 1, wherein: a fixed ratio transmission is coupled in series between the flywheel and the continuously variable transmission (CVT), and is of a fixed ratio such that the flywheel and CVT operate within the specified design ranges for the flywheel and CVT respectively.

3. The wheeled vehicle according to claim 1, wherein: a clutch with corresponding clutch actuation means is coupled between the flywheel and the continuously variable transmission (CVT) or between the CVT and the driven wheel(s) of said vehicle, said clutch actuation means controlled by either manual or automatic action to completely disengage said flywheel from said driven wheel(s) when said wheeled vehicle is either at rest or the desired speed is lower than the speed corresponding to the lowest CVT ratio.

4. The wheeled vehicle according to claim 1, wherein: a prime mover is coupled to the flywheel and is controlled to increase the rotational speed of the flywheel up to the maximum design rotational speed of said flywheel.

5. A wheeled vehicle having a propulsion system based on the use of inertial energy storage and including one or more driven wheels, comprising:
   a) a flywheel for storing inertial energy;
   b) a continuously variable transmission (CVT) having a speed ratio coupled for receiving input torque and rotational propulsive energy from said flywheel and for supplying output torque and rotational propulsive energy to said one or more driven wheels; and
   c) a feedback system for controlling the speed ratio of said CVT as a function of said CVT output torque.

6. The vehicle of claim 5, wherein:
said feedback system for controlling the speed ratio of said CVT controls said CVT as a function of an error signal equal to the difference between the CVT output torque and an operator error signal.

7. The vehicle of claim 5, wherein:
said feedback system for controlling the speed ratio of said CVT controls said CVT as a function of a time integral of an error signal equal to the difference between the CVT output torque and an operator error signal.

8. The vehicle of claim 5, further including:
a fixed ratio transmission connecting said flywheel to said CVT for interfacing said flywheel with said CVT as a function of their operational design ranges.

9. The vehicle of claim 5, further including:
a clutch connecting said flywheel to said CVT for disengaging said flywheel from said CVT when said vehicle is at rest.

10. The vehicle of claim 5, further including:
a prime mover for supplying energy to said flywheel by increasing the rotational speed and inertial energy of said flywheel.

11. A method of controlling the propulsion of a wheeled vehicle having a propulsion system based on the use of inertial energy storage and including a flywheel, a continuously variable transmission (CVT) coupled to said flywheel and one or more driven wheels coupled to said CVT, comprising the steps of:
   a) generating a CVT speed ratio control signal as a function of CVT output torque and operator input; and
   b) feeding back said CVT speed ratio control signal to said CVT for controlling the speed ratio of said CVT.

12. The method of claim 11, wherein:
said CVT speed ratio control signal comprises an error signal equal to the difference between the CVT output torque and an operator error signal.

13. The vehicle of claim 12, wherein:
said CVT speed ratio control signal comprises a time integral of said error signal equal to the difference between the CVT output torque and an operator error signal.

* * * * *